United States Patent Office 3,177,757
Patented Apr. 13, 1965

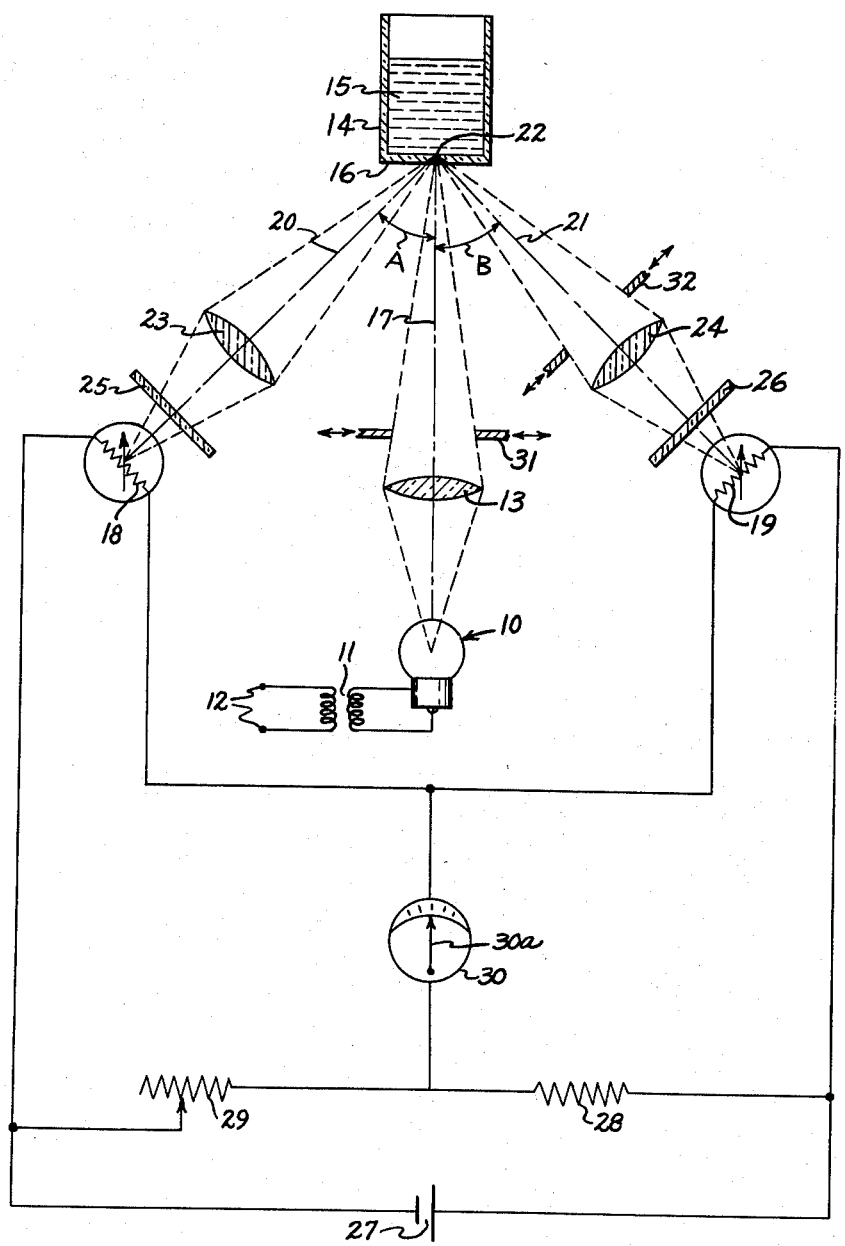

3,177,757
METHOD OF PERFORMING REFLECTIVE
OXIMETRY
Michael L. Polanyi, Webster, Mass., assignor to American Optical Company, Southbridge, Mass., a voluntary association of Massachusetts
Filed Mar. 29, 1960, Ser. No. 18,362
8 Claims. (Cl. 88—14)

This invention relates to the performing of oximetry and has particular reference to a novel and improved method for determining oxygen saturation in unhemolyzed blood.

For clinical purposes, the evaluation of the blood's oxygen saturation offers one of the best integrations of many circulatory and respiratory functions and every deviation from the normal arterial oxygen saturation is significant in anesthesia or diagnostic and functional tests or the like.

Heretofor the oxygen saturation in blood has been determined by light transmission or spectrophotometric techniques wherein the oxygen saturation is obtained from the ratio of the optical densities of a hemolyzed blood sample measured at two appropriate wavelengths. The disadvantage of this method is the need for hemolysis, a process which is a possible source of error and still worse for some applications, destroys the sample. Furthermore, the procedure is somewhat lengthy.

In an attempt to overcome the above mentioned drawbacks of the light transmission method of performing oximetry, there has been devised heretofore a reflection technique wherein light diffusely reflected by an unhemolyzed blood sample is correlated with the oxygen saturation thereof.

While the reflection technique overcomes the need for hemolysis, reflection oximetry previous to this invention has been unable to give absolute values of oxygen saturation and therefore actually has had less practical value than the transmission method. The readings taken by instrumentations used in conventional reflection techniques are dependent upon the geometry of the particular instrument, the intensity of the light and other existing factors such as differences between individual blood samples wherein the said differences relate more particularly to variations in shape and size of the red cells and, in normal cases, different concentrations of white cells.

The present invention overcomes the drawbacks and difficulties experienced heretofor in oximetry by providing a novel and improved means and method for performing reflection oximetry wherein two wavelengths of light are utilized and absolute determination of oxygen saturation is accomplished by correlation with the ratio of light intensities reflected by an unhemolyzed, undiluted specimen at these two wavelengths. It will become apparent hereinafter that with the present invention the intensity of the incident light, the geometry of the instrument and the differences between individual blood samples do not enter into the calibration of the instrument or effect the final determination of oxygen saturation.

A principal object of the invention is to provide a novel, improved and simple method for determining the oxygen saturation in samples of blood.

Another object is to provide a simplified and relatively inexpensive method by which oximetry may be rapidly and accurately performed to produce an absolute determination of oxygen saturation of unhemolyzed blood.

Another object is to provide a method of the above character designed more particularly for clinical use and which is capable of rapidly and repeatedly producing results of an accuracy comparable to that which would be expected under precise laboratory conditions.

Another object is to provide a novel method for performing oximetry by the utilization of means to direct light onto an unhemolyzed blood specimen and means to receive portions of said light which is reflected by said specimen, said portions of said light being of different wavelengths and means to determine the ratio of intensities of said light of said different wavelengths from which the extent of oxygen saturation of said specimen may be readily determined.

Another object is to provide a method of the above character by which accurate determinations of the oxygen saturation of unhemolyzed blood samples may be made quickly and independently of variations in the intensity of light, geometry of the instrument and/or skill of the analyst.

Other objects and advantages of the invention will become apparent from the following description when taken in conjunction with the accompanying drawing in which:

The figure is a schematic illustration of means for carrying out the method of the invention.

Referring more particularly to the drawing, wherein a schematic representation of a preferred instrumentation for carrying out the method of the invention is shown, the general arrangement embodies a light source 10 preferably in the form of a tungsten filament lamp which is electrically connected through a conventional constant power transformer 11 to a suitable source of current 12. The transformer 11 is provided to avoid fluctuations in the spectral distribution of the light source. The light from the source 10 is directed through a lens element 13 which is preselected to be of such character as to condense said light upon the bottom of a cylindrical cuvette 14 containing a liquid specimen 15 under test. The cuvette is placed at a preselected distance from the lens 13 with the plane of its bottom 16 disposed normal to the projection axis 17 of the light from the lamp 10. The cuvette is formed of a relatively thin transparent material such as glass or the like and is preferably approximately 15 mm. in internal diameter and contains a liquid specimen 15 having a minimum depth of approximately 3 mm. It being understood, of course, that the sizes of the cuvette and depth of specimen may be varied as desired.

As will be described in detail hereinafter the light which is condensed upon the bottom of the cuvette will be scattered by the specimen 15 and at least partially reflected thereby in directions oblique to the projection axis 17. When referring to reflection herein with relation to the scattering of light from a blood specimen, it is intended to mean diffused back scattering of light by the blood cells and not specular reflection.

In order to provide for analysis of said scattered and reflected light, a pair of matched photoconductors 18 and 19 are disposed, one at each side of the projection axis 17 along the respective axes 20 and 21 which are disposed at substantially equal angles A and B relative to the projection axis 17 and intersect the said axis 17 at approximately the point 22 where the light from the source 10 impinges upon the sample 15. The angles A and B are preferably controlled to total approximately 135° but may be of any other suitable magnitude.

Condensing lens elements 23 and 24 are located along the respective axes 20 and 21 and function to condense a portion of the reflected light from the specimen 15 upon each of the photoconductors 18 and 19. Interference filters 25 and 26, to be described in greater detail hereinafter, are placed between the lens elements 23 and 24 and their respective photoconductors 18 and 19 to permit only preselected wavelength of the reflected light to impinge upon said photoconductors while shielding said photoconductors from wavelengths other than those having been preselected.

The photoconductors 18 and 19 which are preferably formed of cadmium selenide or the like and are rendered more or less resistive in accordance with the intensities of the preselected wavelengths of light which impinge thereupon are connected to a suitable source of direct current 27 such as, for example, a 100 volt source through a Wheatstone bridge type of circuit such as is illustrated in FIG. 1. The bridge circuit embodies a fixed resistance 28 which might be a $100K\Omega$ resistor and the photoconductor 19 in one of its legs. The other leg of the bridge circuit embodies a variable resistance 29 and the photoconductor 18. The resistance 29 may, for example, be a $0-300K\Omega$ 10 turn potentiometer. A meter or galvanometer 30 is interconnected in conventional manner across said bridge legs to record any electrical imbalance in the bridge circuit. It is pointed out that the above described bridge circuit has been shown and described herein for purposes of illustration only, it being understood that other types of similar measuring circuits and light detectors may be employed.

In order to provide means for properly standardizing or nulling the instrumentation, which operation will be described in detail hereinafter, an adjustable diaphragm 31 such as the well-known iris type is placed in the light path along the axis 17 to permit an adjustment of the general level of illumination by opening or closing the diaphragm aperture. A second similar diaphragm 32 is placed in the reflected light path which is defined by the axis 21 and by means of which the amount of light impinging upon the photoconductor 19 may be adjusted to bring about a desired null condition of the bridge circuit when a suitable standard such as will be described hereinafter is used to replace the specimen 15.

Referring more particularly to the intent and purpose of the above described instrumentation, it is pointed out that the ratio of the light intensities reflected by unhemolyzed blood taken at two different wavelengths is proportional to the inverse of the optical densities of the same blood when hemolyzed and the ratio of the optical densities of hemolyzed blood is, in turn, a unique function of the oxygen saturation of the blood. Thus, the purpose of this invention is to provide means and method of obtaining an absolute determination of oxygen saturation in blood by a novel reflection technique. Oxygen saturation is the ratio of oxyhemoglobin to total hemoglobin and in the optical methods of oxygen saturation determination, it is always assumed that the hemoglobin is present only as oxyhemoglobin and reduced hemoglobin.

In accordance with the invention, oxygen saturation is obtained by determination of the ratio of light intensities reflected by an unhemolyzed sample at two suitable wavelengths which ratio has been found to be a linear function of the oxygen saturation. One of said two wavelengths must be an isobestic point wherein the extinction coefficients of both oxyhemoglobin and reduced hemoglobin are equal for that particular wavelength. Since 805 m$\mu$ is a wavelength corresponding to such an isobestic point, the interference filter 26 has been selected to be of such character as to limit the light reaching the photoconductor 19 to a narrow band centered at approximately 805 m$\mu$ and the interference filter 25 has been selected to be of such character as to limit the light reaching the photoconductor 18 to a narrow band centered at approximately 660 m$\mu$. It should be understood, however, that any other two wavelengths may be used provided the extinction coefficients for both oxyhemoglobin and reduced hemoglobin is not too high to measure the reflected light and further provided that there is an appreciable difference between the extinction coefficients of the selected wavelengths.

Having arranged the instrumentation with the above described interference filters 25 and 26, an indication of the ratio which is represented as light intensity reflected at 805 m$\mu$
light intensity reflected at 660 m$\mu$ is determined from the ratio which is represented as resistance of photoconductor 18
resistance of photoconductor 19

When said resistances of photoconductors 18 and 19 differ, an imbalance of the above described bridge circuit results causing the pointer 30a of the meter 30 to deflect.

In operation, the instrumentation is first standardized by replacing the cuvette 14 with a similar cuvette containing a "white standard" such as magnesium oxide which is characterized in that it is a known optical standard which reflects or scatters light of all wavelengths equally. With the white standard in place, the aperture of the diaphragm 31 is adjusted to the point where the general level of illumination of the scattered or reflected light of wavelength 805 m$\mu$ (the isobestic point) is approximately equalized to light of the same wavelength which would be scattered by an unhemolyzed blood specimen 15. With the variable resistance 29 adjusted to equal the resistance 28, the aperture size of the diaphragm 32 is adjusted to null the bridge by increasing or decreasing the intensity of the light impinging on the photoconductor 19 and thereby cause a zeroing of the meter 30. With the instrument so standardized, the diaphragm 31 is opened so that when a blood sample 15 replaces the white standard, the level or intensity of the 805 m$\mu$ light scattered or reflected from the sample 15 will be approximately equal to the level or intensity of said 805 m$\mu$ light which was previously scattered by the white standard during the nulling of the bridge circuit.

This procedure assures that a condition is maintained where a blood specimen or the like, which scatters light equally at the wavelength 660 m$\mu$ and 805 m$\mu$ causes the photoconductors to assume equal resistances.

With the white standard removed and the cuvette 14 which contains the unhemolyzed blood specimen 15 again positioned as shown in the figure, light of the wavelength 660 m$\mu$ which is scattered and reflected by the specimen 15 in the direction of the axis 20 will be received by the photoconductor 18 and, similarly, light of the wavelength 805 m$^u$ which is scattered and reflected by the specimen 15 generally along the axis 21 will be received by the photoconductor 19. Variations in the intensities of these two different wavelengths of light will render said photoconductors 18 and 19 differently resistive and thereby create an imbalance of the bridge circuit which will be indicated by deflection of the pointer 30a of the meter.

By adjusting the variable resistance 29 to the point where the meter 30 is again zeroed and noting the amount of change of resistance required to zero the meter 30, an indication of the ratio of the resistance of the photocells 18 and 19 is obtained. The ratio of the light intensities scattered by the sample 15 is then the inverse of the photoconductor resistances. As stated above, this ratio of the scattered light intensities is a linear function of the oxygen saturation of the blood specimen 15 under test and the oxygen saturation (O.S.) is then computed from the equation $$O.S. = A_r + B_r \frac{I_r(805)}{I_r(660)}$$

where $$\frac{I_r(805)}{I_r(660)}$$

is the ratio of the scattered light intensities.

$I_r$ (805) being the light intensity diffusely reflected from the specimen at the wavelength 805 m$\mu$; $I_r$ (660) being the light intensity diffusely reflected from the specimen at the wavelength 660 m$\mu$ and $A_r$ and $B_r$ are constants determined experimentally.

$$A_r \cong 1.13 \text{ and } B_r \cong -.28$$

when the wavelengths 805 m$\mu$ and 660 m$\mu$ are used as outlined above.

It is pointed out that a continuous flow of unhemolyzed blood may be passed through the cuvette 14 or through a similar transparent container specially designed for this purpose.

With such an arrangement, the instrumentation of the figure may be used to monitor said continuous flow of blood and thereby give a continuous indication of the bloods oxygen saturation. Also, the device of the invention may be used to measure the amount and/or presence of dye injected into a blood stream in connection with dye dilution techniques used to study circulation of blood in living bodies.

From the foregoing, it will be seen that simple, efficient and economical means and method have been provided for accomplishing all of the objects and advantages of the invention as expressed in the accompanying claims and the invention is not to be limited to the exact matters shown and described as only the preferred matters have been given by way of illustration.

Having described my invention, I claim:

1. The method of determining an absolute value of oxygen saturation of an unhemolyzed blood specimen comprising directing light along an optical path onto a surface of the blood of said specimen in such manner as to cause a substantial amount of said light to be reflected by said specimen, selectively filtering a first portion of said reflected light to remove substantially all wavelengths therefrom but a first preselected wavelength of light corresponding to an isobestic point where oxyhemoglobin and reduced hemoglobin in said blood specimen have substantially equal extinction coefficients for said preselected wavelength, selectively filtering a second portion of said reflected light to remove substantially all wavelengths therefrom but a preselected second wavelength of light for which said oxyhemoglobin and reduced hemoglobin have appreciably different extinction coefficients, measuring the ratio of intensity of one of said preselected wavelengths of light to the other and determining from said ratio an absolute value of oxygen saturation of said specimen.

2. The method of determining an absolute value of oxygen saturation of an unhemolyzed blood specimen comprising directing light along a first optical path onto a surface of the blood of said specimen in such manner as to cause a substantial amount of said light to be reflected by said specimen, selectively filtering a first portion of said reflected light to remove substantially all wavelengths therefrom but a first preselected wavelength of light corresponding to an isobestic point where oxyhemoglobin and reduced hemoglobin in said blood specimen will each reflect substantially equal amounts of said first wavelength of light, selectively filtering a second portion of said reflected light to remove substantially all wavelengths therefrom but a preselected second wavelength of light which is characterized in being relatively efficiently reflected by said oxyhemoglobin and appreciably less efficiently reflected by said reduced hemoglobin, measuring the ratio of intensity of said first wavelength of light to said second wavelength of light and determining from said ratio an absolute value of oxygen saturation of said specimen.

3. The method of determining an absolute value of the oxygen content of an unhemolyzed blood specimen comprising directing light along a first optical path onto a surface of the blood of said specimen in such manner as to cause a substantial amount of said light to be reflected by said specimen, selecting from a first portion of said reflected light substantially only a wavelength of approximately 805 m$\mu$, selecting from a second portion of said reflected light substantially only a wavelength of approximately 660 m$\mu$, and comparing the quantity of light in said selected wavelengths as reflected from said specimen to determine the oxygen content of said specimen.

4. The method of determining an absolute value of the oxygen content of an unhemolyzed blood specimen comprising directing light along a first optical path onto a surface of the blood of said specimen in such manner as to cause a substantial amount of said light to be reflected by said specimen, selecting from a first portion of said reflected light only those wavelengths which are substantially equally reflected by oxyhemoglobin and reduced hemoglobin in said blood specimen, selecting from a second portion of said reflected light only those wavelengths which are reflected by said oxyhemoglobin and reduced hemoglobin with a maximum difference in quantity and comparing the quantity of light in said selected wavelengths as reflected from said specimen to determine the oxygen content of said blood specimen.

5. The method of determining an absolute value of oxygen saturation of an unhemolyzed blood specimen comprising directing light onto the surface of the blood of said specimen in such manner as to cause a substantial amount of said light to be reflected by said specimen, dividing a substantial part of said reflected light into first and second portions, selectively filtering said first portion of reflected light to remove substantially all wavelengths therefrom but a first preselected wavelength of light corresponding to an isobestic point wherein the extinction coefficients of both oxyhemoglobin and reduced hemoglobin in said blood specimen are approximately equal for said preselected wavelength, filtering said second portion of reflected light to remove substantially all wavelengths therefrom but a second preselected wavelength of light for which said oxyhemoglobin and reduced hemoglobin have appreciably different extinction coefficients, causing said first and second preselected wavelengths to impinge upon respective first and second photoconductive members to render said photoconductive members electrically resistive proportionately in accordance with the intensities of said respective first and second preselected wavelengths of light and measuring the ratio of the resistance value of one of said photoconductive members to that of the other member to determine the ratio of intensity of said first preselected wavelength of light to said second preselected wavelength of light and determining from said ratio of intensities an absolute value of oxygen saturation of said unhemolyzed blood specimen.

6. The method of determining an absolute value of oxygen saturation of an unhemolyzed blood specimen comprising directing light onto the surface of the blood of said specimen in such manner as to cause a substantial amount of said light to be reflected by said specimen, dividing a substantial part of said reflected light into first and second portions, selectively filtering said first portion of reflected light to remove substantially all wavelengths therefrom but a first preselected wavelength of approximately 805 m$\mu$, filtering said second portion of reflected light to remove substantially all wavelengths therefrom but a second preselected wavelength of approximately 660 m$\mu$, causing said first and second preselected wavelengths to impinge upon respective first and second photoconductive members to render said photoconductive members electrically resistive proportionately in accordance with the intensities of said respective first and second preselected wavelengths of light and measuring the ratio of the resistance value of one of said photoconductive members to that of the other member to determine the ratio of intensity of said first preselected wavelength of light to said second preselected wavelength of light and determining from said ratio of intensities an absolute value of oxygen saturation of said unhemolyzed blood specimen.

7. The method of determining an absolute value of oxygen saturation of an unhemolyzed blood specimen comprising directing light along a first preselected optical path upon a standard characterized to reflect light of substantially all wavelengths equally, filtering a first portion of said reflected light to remove substantially all wavelengths therefrom but a first preselected wavelength of light corresponding to an isobestic point where oxyhemoglobin and reduced hemoglobin in an unhemolyzed blood specimen will have substantially equal extinction coefficients for said preselected wavelength, filtering a second portion of said reflected light to remove substantially all wavelengths therefrom but a second preselected wavelength of light for which said oxyhemoglobin and reduced hemoglobin have appreciably different extinction coefficients, rendering said first and second preselected wavelengths of light approximately equal in intensity and at a level approximately equal to that which would result from reflection of said first preselected wavelength from an unhemolyzed blood specimen, replacing said standard with an unhemolyzed blood specimen, measuring the ratio of intensity of said first wavelength of light to said second wavelength of light and determining from said ratio the absolute value of oxygen saturation of said specimen.

8. The method of determining an absolute value of oxygen saturation of an unhemolyzed blood specimen comprising directing light along a first preselected optical path upon a standard characterized to reflect light of substantially all wavelengths equally, filtering a first portion of said reflected light to remove substantially all wavelengths therefrom but a first preselected wavelength of approximately 805 m$\mu$, filtering a second portion of said reflected light to remove substantially all wavelengths therefrom but a second preselected wavelength of light of approximately 660 m$\mu$, rendering said first and second preselected wavelengths of light approximately equal in intensity and at a level approximately equal to that which would result from reflection of said first preselected wavelength from an unhemolyzed blood specimen, replacing said standard with an unhemolyzed blood specimen, measuring the ratio of intensity of said first wavelength of light to said wavelength of light and determining from said ratio the absolute value of oxygen saturation of said specimen.

References Cited by the Examiner

UNITED STATES PATENTS

| | | | |
|---|---|---|---|
| 2,008,410 | 7/35 | Wilson | 88—14 |
| 2,051,320 | 8/36 | States | 88—14 |
| 2,382,439 | 8/45 | Osborn | 88—22.5 |
| 2,706,927 | 4/55 | Wood | 88—14 |

FOREIGN PATENTS

| | | |
|---|---|---|
| 922,455 | 6/47 | France. |
| 777,651 | 6/57 | Great Britain. |

OTHER REFERENCES

Oximetry, W. Paul, IRE Transactions on Medical Electronics, pages 34–38, July 1958.

JEWELL H. PEDERSEN, *Primary Examiner.*

EMIL G. ANDERSON, FREDERICK M. STRADER, *Examiners.*